Aug. 10, 1965  S. POVERING  3,199,717
CLOSURE FOR CONTAINERS
Filed July 9, 1963
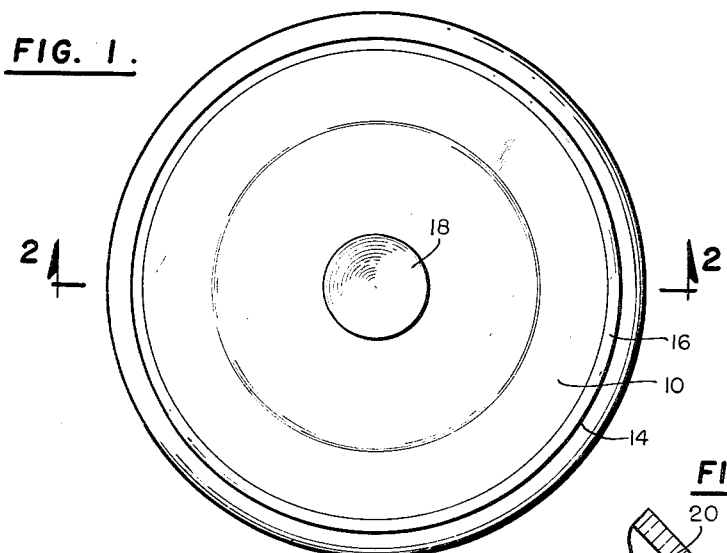
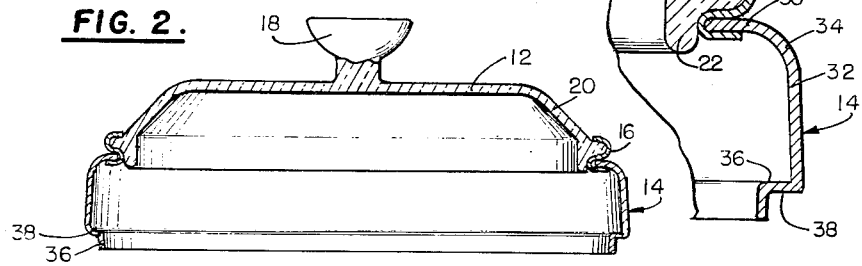
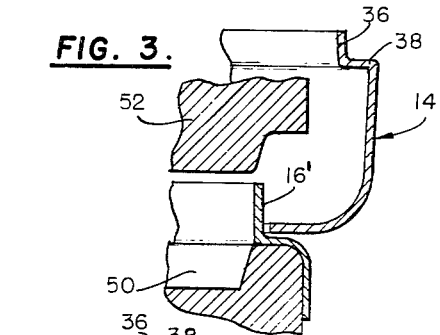
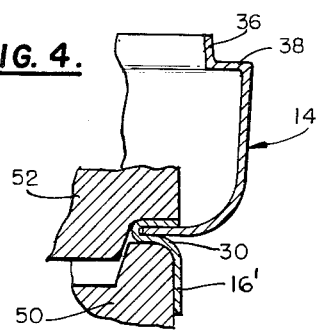
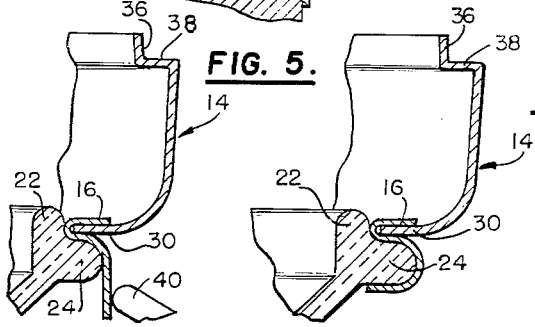
INVENTOR
Sam Povering
BY Lawrence I. Field
ATTORNEY

United States Patent Office 3,199,717
Patented Aug. 10, 1965

3,199,717
CLOSURE FOR CONTAINERS
Sam Povering, Woodbridge, Ontario, Canada
(36 Rivalda Road, Weston, Ontario, Canada)
Filed July 9, 1963, Ser. No. 293,616
1 Claim. (Cl. 220—82.5)

This invention relates to a cover for saucepans, casseroles or other vessels, and to the method of manufacturing said cover. More particularly it relates (a) to a see-through cover consisting principally of a circular shaped heat resistant glass portion and a composite metal rim tightly encircling the periphery of the glass portion and (b) to the manner in which the several pieces are assembled into a finished article.

It is known to provide cookware with covers made entirely of glass but covers of this type are objectionable because the edge of the glass may chip with the consequent danger either that fragments of glass may fall into the contents of the vessel, or that the chip may leave a sharp edge on which the user may be cut—neither of which desirable.

To avoid these and other disadvantages inherent in the use of a cover made entirely from glass, it has been suggested the rim of the glass be provided with a metal guard. The fastening of such a guard directly to the glass portion of the cover has proven to be somewhat difficult although a variety of clips have been developed to hold the metal guard on the rim of the glass.

Among the clips heretofore suggested are split rings of light gage metal and other multiple piece metal constructions fitted together around the glass. Any such constuctions in which at the locations where the edges of two or more pieces meet there may be crevices or spaces in which food or dirt may tend to collect are of course unsuitable, particularly since the removal of such accumulations is largely unsupervised in the automatic dishwashing equipment used in public eating places and in many homes.

One object of the instant invention is to provide a cover in which the metal ring encircling the glass body portion is tightly secured to the glass by a method of fabrication which results in a product free from any joints or crevices in which foreign material may accumulate.

Another object of the invention is to provide a cover which is simple to construct and which is easy to clean and which has a pleasing appearance.

These and other objects of the invention will become apparent from the description which follows including the drawings in which:

FIGURE 1 is a plan view of a pot cover made in accordance with the present invention;

FIGURE 2 is a view partly in section taken along plane 2—2 of FIGURE 1;

FIGURE 2A is an enlarged view of a portion of FIGURE 2 and FIGURES 3 through 6 show schematically the manner in which the three portions of the cover of FIGURE 1 are progressively brought together during the manufacture of the complete cover.

As may be seen from the drawings the cover 10 is formed from three separate pieces and consists of a Pyrex or heat resistant glass portion 12 having a circular or oval shape, an outer metal ring 14 of relatively thick metal and an inner "S" shaped metal ring 16 of relatively thin metal fitting between the outer ring 14 and the glass body 12 and securing the outer ring 14 to the glass portion 12.

The glass portion is provided with a glass knob or handle 18 cast integrally with the glass body. The glass body is of a relatively shallow dished configuration having walls 20 which slope downwardly to a rounded flange 22 so that condensate collecting on the inner, lower side of the glass portion may run down on the glass walls and drip down directly into the contents of the pot (not shown) without contacting substantial areas of the metallic portions of the cover. Extending outwardly of the vertical flange 22 is a horizontal flange 24 to which the metallic portions of the cover are secured, after the two metal pieces have first been fabricated into a unitary structure.

In order that the cover may be seated properly in the vessel to be covered, outer ring 14 is preferably formed of relatively thick aluminum. Ring 14 consists of a relatively flat upper portion 30 which is joined to a sloping outer wall portion 32 by a smooth curved section 34. At the base of portion 32 the ring is stepped inwardly to define a smaller ring 36 which is to be received into the opening of the vessel to be covered and a substantially horizontal portion 38 adapted to be supported on the upper rim of said vessel. After being formed on conventional press equipment so as to possess the shape shown in the drawings, the outer ring 14 is anodized and colored a pleasing shiny copper tone, by known processes not forming a part of the present invention. A thinner metal blank 16' is given a ᒪ shape by conventional metal forming means and thereafter the sturdy outer ring 14 and the relatively thinner ᒪ shaped metal blank are placed in a press e.g. as shown in FIGURES 3 and 4, in such a way that the horizontal middle part of the thin preformed blank 16' rests on a die ring 50. The press includes a die punch 52 which bends on leg of the blank 16' over the inner side of the horizontal portion 30 of ring 14 when the die ring and die punch are brought together. In this way one half of blank 16' is disposed on both sides of the inner rim portion 30 of outer ring 14 so as to be securely held onto that portion of the outer metal ring, care being taken not to mar the finish or the surface of ring 14 during the pressing operation. Preferably ring 14 and blank 16' are upside down in the press during their fabrication into a unitary structure.

Next the glass member 10 is placed in a metal forming machine with the glass portion upside down, i.e. as shown in FIGURE 5. The ring and rim assembly produced as described above is then supported between flange 22 and flange 24 and while the pieces are so positioned a spinning tool 40 is moved along and against the free end of the thin metal blank 16' in order to turn the same over the periphery of the flange 24 of the glass body portion thereby completing the assembly of the three pieces into an integral until free from any of the defects noted above.

It will be seen that the "S" shaped ring 16 constitutes a one-piece clip which provides a permanent resilient connection between relatively sturdy ring 14 and glass cover 12, and that such connection is characterized by a simplicity which facilitates cleaning and which gives it a pleasing appearance.

Having now described this invention in accordance with the patent statutes it is not intended that it be limited except as may be required by the appended claim.

I claim:

A see-through metal-glass cover for saucepans or other cooking vessels comprising a permanently secured assembly which consists of (1) a glass member including an upstanding knob, located at the center of a generally flat horizontal cover portion, a downwardly sloping wall extending from the periphery of said generally flat horizontal portion and terminating in a pair of rounded flanges, the first of which extends outwardly horizontally from said sloping wall and the second of which extends downwardly vertically from said wall toward the inside of the vessel on which the cover is to be supported, said glass member being permanenly secured to (2) a sturdy one-piece metal ring of relatively thick material consisting of a horizontal portion at its uppermost extremity, a curved transition section connecting said horizontal portion with an annular vertical side wall the lowermost end of which is stepped so as to be received on the rim of a vessel to be covered and (3) means permanently securing said glass member (1) to said metal ring (2) said means comprising a one-piece band of relative thin metal and of uniform width throughout disposed securely about the uppermost horizontal edge of said metal ring and holding same adjacent to said first flange on said glass member, and turned over said first flange, the shape of said band consisting of an "S," the upper loop of which embraces said first flange and the lower loop of which is flattened so as to embrace the horizontal edge of said ring, so as to secure said glass member to said metal ring in a permanently bonded cover.

References Cited by the Examiner

UNITED STATES PATENTS

| 2,165,630 | 7/39 | Gardella | 220—82.5 |
| 2,523,526 | 9/50 | Sciurba | 220—82.5 |
| 3,078,005 | 2/63 | Lewerth | 220—24 |

THERON E. CONDON, *Primary Examiner*

GEORGE O. RALSTON, *Examiner.*